(12) United States Patent
Tu et al.

(10) Patent No.: US 8,816,957 B2
(45) Date of Patent: Aug. 26, 2014

(54) ELECTRONIC DEVICE

(75) Inventors: Chun-Hao Tu, Changhua County (TW);
 Kuo-Sen Kung, Kaohsiung (TW);
 Jun-Hong Jan, Yunlin County (TW);
 Wei-Jhih Lian, Taipei County (TW);
 Yu-Jung Liu, Kaohsiung (TW);
 Fang-Hui Chan, Hsinchu County (TW);
 Jiun-Jye Chang, Hsinchu (TW);
 Po-Lun Chen, Hsinchu County (TW)

(73) Assignee: Au Optronics Corporation, Hsinchu (TW)

(*) Notice: Subject to any disclaimer, the term of this patent is extended or adjusted under 35 U.S.C. 154(b) by 775 days.

(21) Appl. No.: 13/030,146

(22) Filed: Feb. 18, 2011

(65) Prior Publication Data

US 2012/0105401 A1 May 3, 2012

(30) Foreign Application Priority Data

Oct. 29, 2010 (TW) ................................ 99137277 A

(51) Int. Cl.
 *G06F 3/038* (2013.01)
(52) U.S. Cl.
 USPC ........................... 345/156; 345/173; 136/245
(58) Field of Classification Search
 CPC ...... G06F 1/1635; G06F 1/263; Y02E 10/542
 USPC .......... 345/156, 173, 207, 211; 136/244–246
 See application file for complete search history.

(56) References Cited

U.S. PATENT DOCUMENTS

| 5,260,885 A * | 11/1993 | Ma .......................... 361/679.26 |
| 7,875,793 B2 | 1/2011 | Hsiao et al. |
| 2009/0095340 A1* | 4/2009 | Hsiao et al. .................. 136/246 |

FOREIGN PATENT DOCUMENTS

| CN | 2100660 U | 4/1992 |
| CN | 101414643 A | 4/2009 |
| JP | 2003-166220 | 6/2003 |
| JP | 2003-255125 | 9/2003 |
| JP | 2003255125 A * | 9/2003 |
| JP | 2008-181688 | 8/2008 |
| TW | 171794 | 10/1991 |

OTHER PUBLICATIONS

"First Office Action of China Counterpart Application", issued on Apr. 1, 2012, p. 1-p. 8.
"Office Action of Taiwan Counterpart Application", issued on Jun. 24, 2014, pp. 1-12.

* cited by examiner

*Primary Examiner* — Amare Mengistu
*Assistant Examiner* — Jennifer Zubajlo
(74) *Attorney, Agent, or Firm* — Jianq Chyun IP Office

(57) ABSTRACT

An electronic device including a display unit and a photoelectric conversion board is provided. The display unit includes a display surface and a back surface which are opposite to each other, and an edge of the photoelectric conversion board is rotatably connected to the back surface of the display unit. The photoelectric conversion board includes a substrate, a first photoelectric conversion unit, and a second photoelectric conversion unit. The substrate has a first surface and a second surface which are opposite to each other, the first photoelectric conversion unit is disposed on the first surface, the second photoelectric conversion unit is disposed on the second surface, and an absorption band of the first photoelectric conversion unit is different from an absorption band of the second photoelectric conversion unit.

33 Claims, 18 Drawing Sheets

ELECTRONIC DEVICE

CROSS-REFERENCE TO RELATED APPLICATION

This application claims the priority benefit of Taiwan application serial no. 99137277, filed on Oct. 29, 2010. The entirety of the above-mentioned patent application is hereby incorporated by reference herein and made a part of this specification.

BACKGROUND OF THE INVENTION

1. Field of the Invention

The disclosure is related to an electronic device, and in particular to an electronic device including a photoelectric conversion board.

2. Description of Related Art

Generally, electronic devices operate on power provided from external power sources. However, there has been shortages of fossil fuels in recent years, and people have become more conscious about the environment. Therefore, people have been constantly researching alternative energy and regenerable energy in hope of reducing the dependency on fossil fuels and the impact of fossil fuels on the environment. Among the technologies of alternative energy and regenerable energy, solar cells have grabbed the most attention. This is because solar cells are able to directly convert solar energy into electrical power, and harmful substances such as carbon dioxide or nitrides are not produced during power generation and thus no pollution is released into the environment.

Currently, since photoelectric conversion efficiency of solar cells has been continuously and significantly increasing and manufacturing costs have been gradually reduced, electronic devices equipped with solar cells have progressive emerged. However, a single type of solar cell cannot be suitable for light in every kind of environment, so that photoelectric conversion efficiency of solar cells varies along with an environment in which the solar cells are located. Therefore, a very important issue in applying solar cells in electronic devices is how to enable solar cells in electronic devices to maximize their power supplying capacity.

SUMMARY OF THE INVENTION

The disclosure provides an electronic device which switches photoelectric conversion boards according to an environment.

The disclosure provides an electronic device which includes a display unit and a first photoelectric conversion board. The display unit includes a display surface and a back surface which are opposite to each other. The first photoelectric conversion board includes a first substrate, a first photoelectric conversion unit, and a second photoelectric conversion unit, wherein an edge of the first photoelectric conversion board is rotatably connected to the display unit. The first substrate includes a first surface and a second surface which are opposite to each other. The first photoelectric conversion unit is disposed on the first surface, and the second photoelectric conversion is disposed on the second surface. An absorption band of the first photoelectric conversion unit is different from an absorption band of the second photoelectric conversion unit.

The disclosure provides an electronic device which includes a display unit and a photoelectric conversion board. The display unit includes a first terminal and a display surface and a back surface which are opposite to each other. The photoelectric conversion board includes a first substrate, a first photoelectric conversion unit, and a second photoelectric conversion unit. The first substrate includes a second terminal which is connected to the first terminal of the display unit in a detachable manner. The first substrate includes a first surface and a second surface which are opposite to each other, the first photoelectric conversion unit is disposed on the first surface, the second photoelectric conversion unit is disposed on the second surface, and an absorption band of the first photoelectric conversion unit is different from an absorption band of the second photoelectric conversion unit.

Hence, in the electronic device according to the disclosure, the photoelectric conversion units with different absorption bands are disposed on the photoelectric conversion board, and switching between the different photoelectric conversion units on the photoelectric conversion board is able to be performed by rotation or disassembly. Therefore, according to different environments in which the electronic device is placed, by switching to the photoelectric conversion units that correspond to one particular environment, the photoelectric conversion board has greater photoelectric conversion efficiency in various environments and thus provides more stable power to the electronic device.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
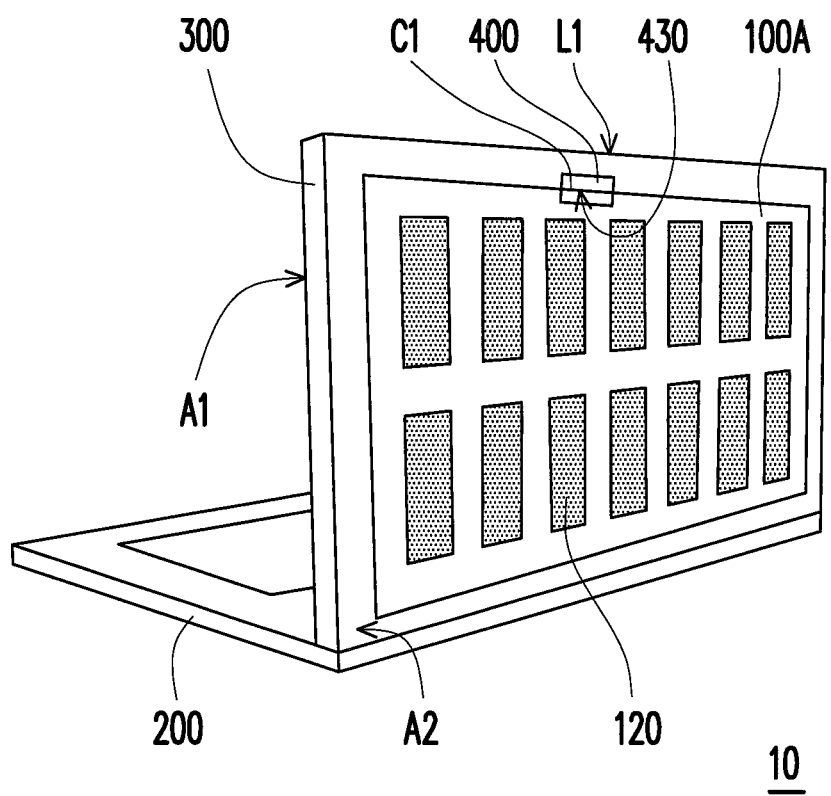
FIG. 1 is a schematic view of an electronic device according to an embodiment of the disclosure.

FIG. 1 is a schematic view of an electronic device according to an embodiment of the disclosure. Please refer to FIG. 1.

According to the present embodiment, an electronic device 10 is, for example, a notebook computer and includes a main host 200, a display unit 300 connected to the host 200, and a first photoelectric conversion board 100A. The display unit 300 is, for example, a liquid crystal display which has a display surface A1 and a back surface A2 opposite to each other. In addition, the electronic device 10 further includes a rotation unit 400 which is connected between an edge of the first photoelectric conversion board 100A and the back surface A2 of the display unit 300, so that the user may rotate the first photoelectric conversion board 100A relative to the display unit 300 through the rotation unit 400.

Figure 2A:
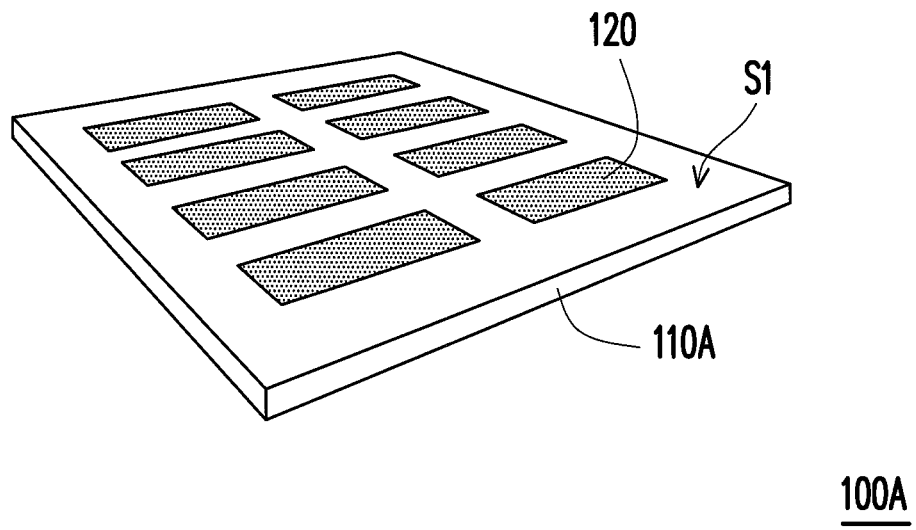
FIGS. 2A and 2B each shows a photoelectric conversion board in FIG. 1 viewed from a different angle.
Figure 2B:
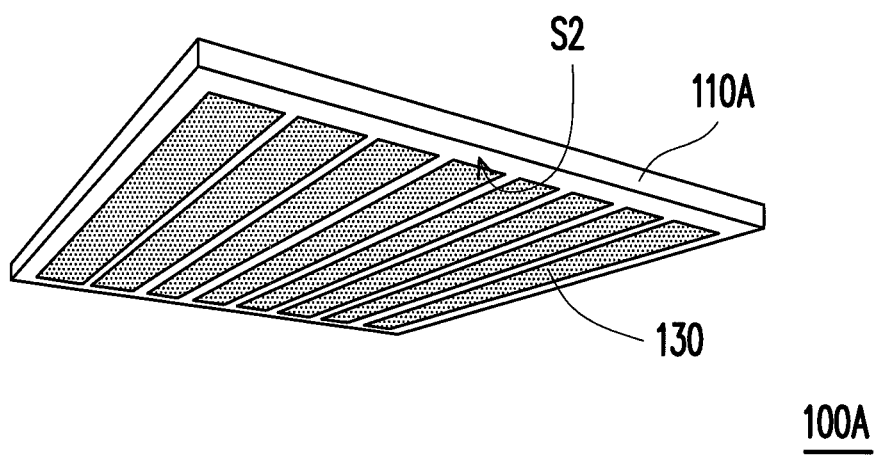

FIGS. 2A and 2B each shows the photoelectric conversion board in FIG. 1 viewed from a different angle. Please refer to all of FIGS. 1, 2A, and 2B. The first photoelectric conversion board 100A includes a first substrate 110A, a first photoelectric conversion unit 120, and a second photoelectric conversion unit 130. The first substrate 110A may be glass, a polyethylene naphthalate (PEN) resin, polyethylene terephthalate (PET), or another suitable flexible material. The disclosure does not limit the types of materials that may be used. The first substrate 110A includes a first surface S1 and a second surface S2 which are opposite to each other, wherein the first photoelectric conversion unit 120 is disposed on the first surface S1, and the second photoelectric conversion unit 130 is disposed on the second surface S2.

It should be noted that according to the disclosure, an absorption band of the first photoelectric conversion unit 120 is different from an absorption band of the second photoelectric conversion unit 130. For example, the first photoelectric conversion unit 120 according to the present embodiment includes an amorphous silicon (a-Si) thin film solar cell module which has an adsorption band mostly in the infrared range (having wavelengths from about 400 nm to about 700 nm), so that the first photoelectric conversion unit 120 is suitable for being operated under sunlight. The electronic device 10 which has the first photoelectric conversion unit 120 is thus suitable for being operated in an outdoor environment. On the other hand, the second photoelectric conversion unit 130 according to the present embodiment includes a monocrystalline silicon or polycrystalline silicon solar cell module which has an adsorption band mostly in the visible light range (having wavelengths from about 700 nm to about 1200 nm), so that the second photoelectric conversion unit 130 is suitable for being operated in an incandescent light bulb environment. The first photoelectric conversion unit 120 and the second photoelectric conversion unit 130 each include at least one solar cell alternatively selected from monocrystalline silicon solar cell, polycrystalline silicon solar cell, amorphous silicon solar cell, dye-sensitized solar cell, organic photovoltaic, compound solar cell or namely thin film solar cell, such as cadmium sulfide (CdS) solar cell, cadmium telluride (CdTe) solar cell, copper indium gallium deselenide (CIS) solar cell, copper indium gallium selenide (CIGS) solar cell, compound contain III-V elements of the periodic table in solar cell), and photo-charged materials solar cell.

The electronic device 10 which has the second photoelectric conversion unit 130 is thus suitable for being operated in an indoor environment. Since the first photoelectric conversion board 100A of the electronic device 10 includes both of the two above photoelectric conversion units 120 and 130, the electronic device 10 is capable of supplying electricity to the electronic device 10 in an outdoor environment or an indoor environment by utilizing the photoelectric conversion units 120 and 130 corresponding to said environments. Hence, the first photoelectric conversion board 100A does not result in instability in power supplied to the electronic device 10 when the electronic device 10 is in different environments with different light wavelengths.

The types and number of the photoelectric conversion units 120 and 130 on the photoelectric conversion board 100A in the electronic device 10 is not limited by the disclosure. The absorption bands of the photoelectric conversion units according to the present embodiment may be selected from at least one of visible light, near-infrared, mid-infrared (having wavelengths from about 3000 nm to about 5000 nm), and far-infrared (having wavelengths from about 8000 nm to about 14000 nm). According to different operation environments, the user is able to switch to corresponding photoelectric conversion units.

In light of the above, by utilizing the photoelectric conversion units 120 and 130 which have different absorption bands, the electronic device 10 enables the user to switch between the different photoelectric conversion units 120 and 130 according to the operation environments of the electronic device 10. Therefore, in environments with light of different wavelengths, the photoelectric conversion board 100A has greater photoelectric conversion efficiency and is capable of providing stable power to the electronic device 10. The power provided by the photoelectric conversion board 100A is able to be used as additional power for an operating system, to increase usable power of a battery, as backup power, and to reduce dependency of the electronic device 10 on external power and to self-charge.

In detail, according to the present embodiment, the first photoelectric conversion unit 120 and the second photoelectric conversion unit 130 share, for example, the first substrate 110A. In other words, according to the present embodiment, the first photoelectric conversion unit 120 is fabricated on the first surface S1 of the first substrate 110A, and the second photoelectric conversion unit 130 is then formed on the second surface S2 of the first substrate 110A by lamination or transfer printing. However, the disclosure does not limit the methods by which the photoelectric conversion units 120 and 130 are formed and combined.

Figure 3A:
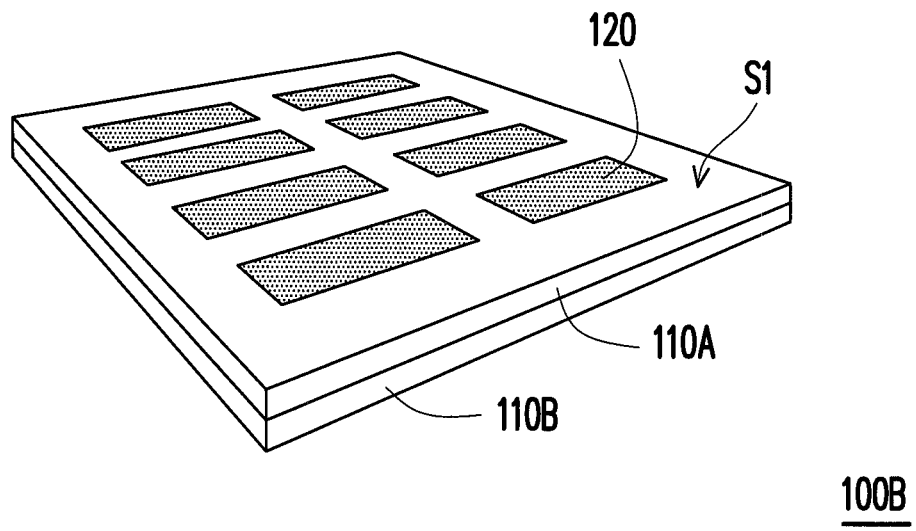
FIGS. 3A and 3B are each a schematic composition view of a photoelectric conversion board in an electronic device according to another embodiment of the disclosure.
Figure 3B:
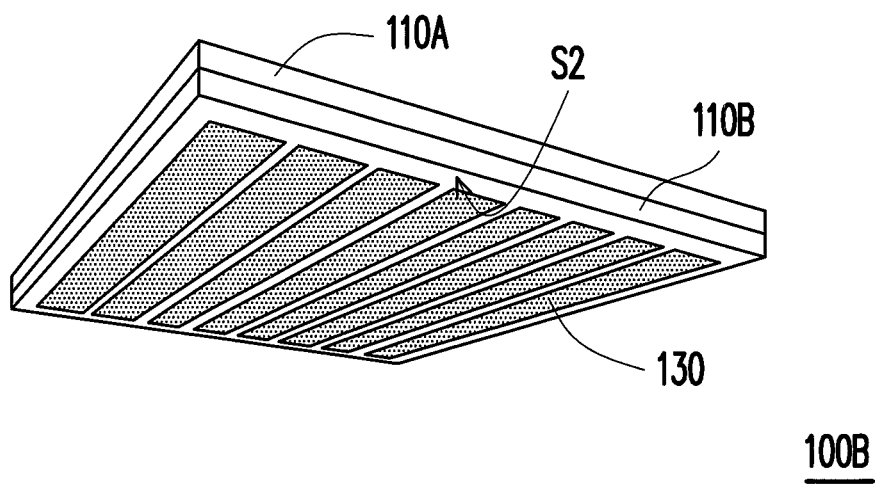

FIGS. 3A and 3B are each a schematic composition view of a photoelectric conversion board in an electronic device according to another embodiment of the disclosure. Please refer to FIGS. 3A and 3B. Different from the above embodiment, a photoelectric conversion board 100B has a second substrate 110B disposed between the first substrate 110A and the second photoelectric conversion unit 130, and the first photoelectric conversion unit 120 and the second photoelectric conversion unit 130 are respectively fabricated on the first substrate 110A and the second substrate 110B. In other words, in the photoelectric conversion board 100B according to the present embodiment, two sets of solar cells are individually fabricated and are laminated into one. The first photoelectric conversion unit 120 is, for example, an amorphous silicon thin film solar cell module, and the second photoelectric conversion unit 130 is, for example, monocrystalline silicon, polycrystalline silicon solar cell module, or the above-mentioned description.

Please refer to FIG. 1. According to the present embodiment, the first photoelectric conversion board 100A is connected to the display unit 300 through a first connection point 430. The first connection point 430 is located on the back surface A2 and maintains a distance from an edge L1 of the back surface A2. According to the present embodiment, the edge L1 may any one of the four contiguous edges of the back surface A2. In particular, in order to facilitate rotation of the first photoelectric conversion board 100A relative to the display unit 300, the first connection point 430 preferably corresponds to a center point C1 of an edge of the first photoelectric conversion board 100A. According to the present embodiment, since the first photoelectric conversion board 100A is rotated relative to the display unit 300 through the rotation unit 400, the rotation unit 400 is, for example, disposed on the first connection point 430.

Figure 4A:
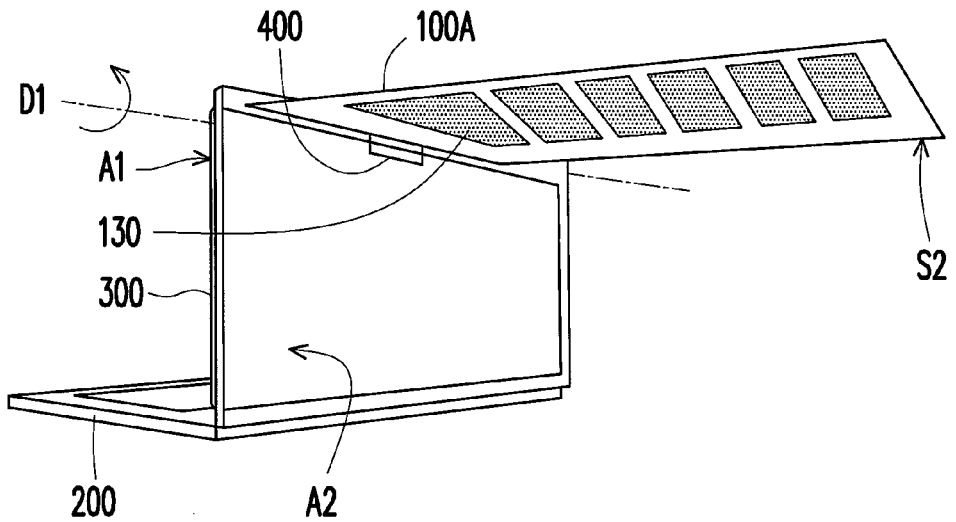
FIGS. 4A to 4D show a switching process of the photoelectric conversion board in the electronic device in FIG. 1.
Figure 4B:
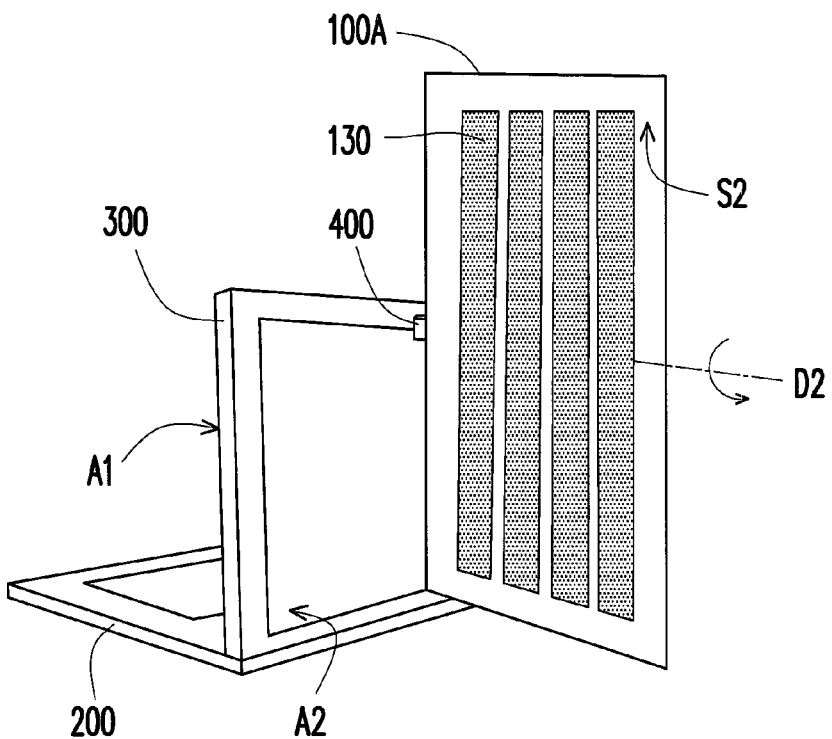
Figure 4C:
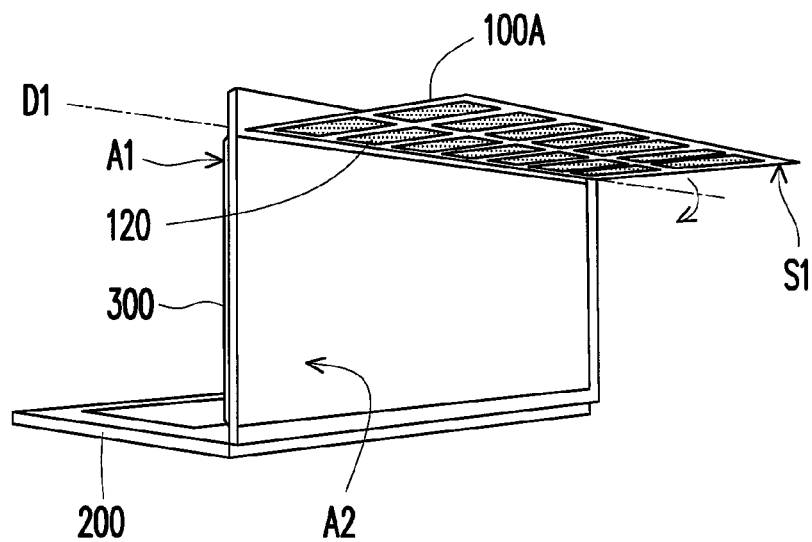
Figure 4D:
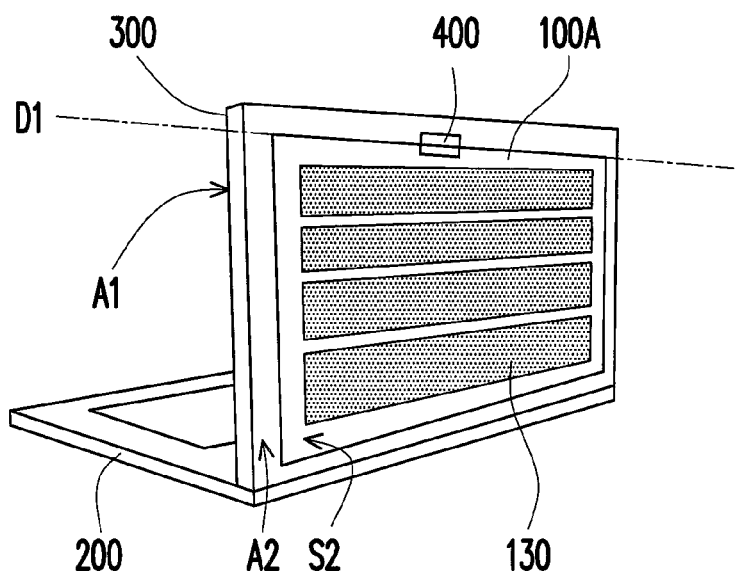
Figure 4E:
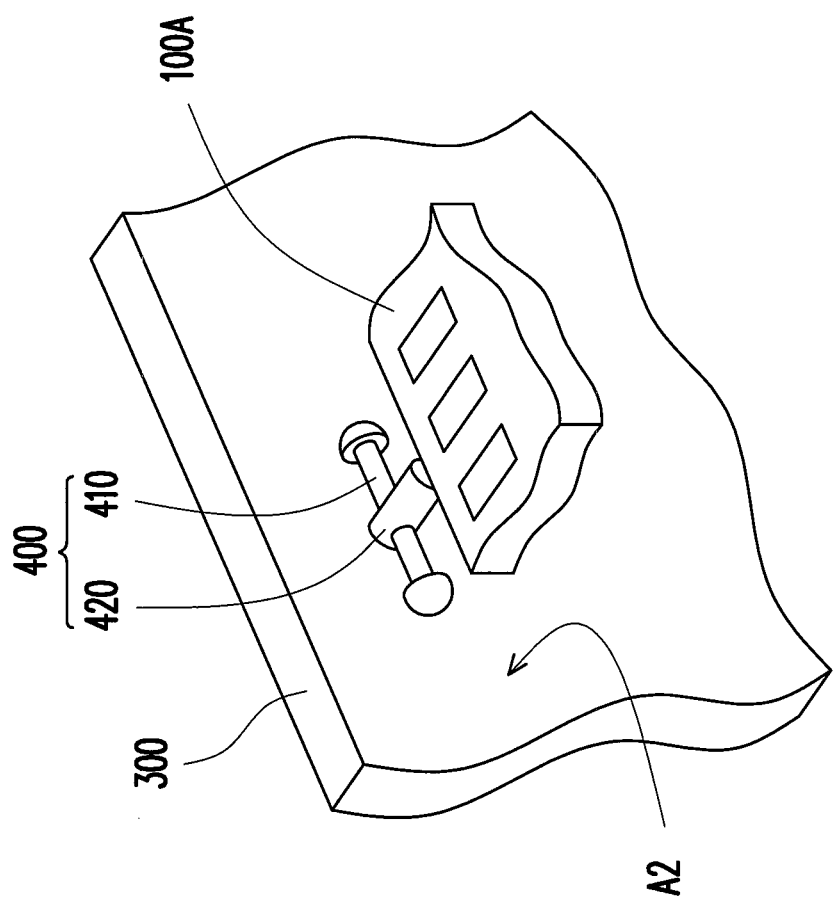
FIG. 4E is a magnified partial view of a rotation unit in FIGS. 4A to 4D.

FIGS. 4A to 4D show a switching process of the photoelectric conversion board in the electronic device in FIG. 1. FIG. 4E is a magnified partial view of a rotation unit in FIGS. 4A to 4D. Please refer to all of FIGS. 4A to 4E. According to the present embodiment, the rotation unit 400 includes a pivotal axis 410 and a connection part 420. The pivotal axis 410 is disposed on the back surface A2 of the display unit 300, and the connection part 420 is connected to the first photoelectric conversion board 100A and is pivotally disposed at the pivotal axis 410. According to FIGS. 4A, 4C, and 4D, the connection part 420 is able to be rotated along a first axial direction D1 relative to the pivotal axis 410, so as to drive the first photoelectric conversion board 100A to rotate along the first axial direction D1. In detail, the connection part 420 enables the first photoelectric conversion board 100A to be rotated from a state shown in FIG. 1 into a state shown in FIG. 4A, and enables the photoelectric conversion board 100A to be rotated from a state shown in FIG. 4C into a state shown in FIG. 4D. On the other hand, according to FIG. 4B, the connection part 420 is able to be rotated along a second axial direction D2, so as to drive the first photoelectric conversion board 100A to be rotated along the second axial direction D2. In detail, the connection part 420 enables the first photoelectric conversion board 100A to be rotated from a state shown in FIG. 4A into a state shown in FIG. 4B, and enables the photoelectric conversion board 100A to be rotated from a state shown in FIG. 4B into a state shown in FIG. 4C. Therefore, the first photoelectric conversion 100A undergoes the rotation shown in FIGS. 4A to 4D through the connection part 420 pivotally disposed at the pivotal axis 410, so as to be rotated from the first surface S1 which includes the first photoelectric conversion unit 120 disposed thereon to the second surface S2 which has the second photoelectric conversion unit 130 disposed thereon. Hence, the photoelectric conversion board 100A is able to be rotated relative to the display unit 300 to achieve switching between the different photoelectric conversion units 120 and 130. The disclosure does not limit the mechanism that enables the rotation of the photoelectric conversion board 100A. The present embodiment only illustrates a preferable one of many embodiments. According to another embodiment which is not shown, a universal joint may be used as the mechanism that enables the photoelectric conversion board 100A to be rotated relative to the display unit 300.

Figure 5:
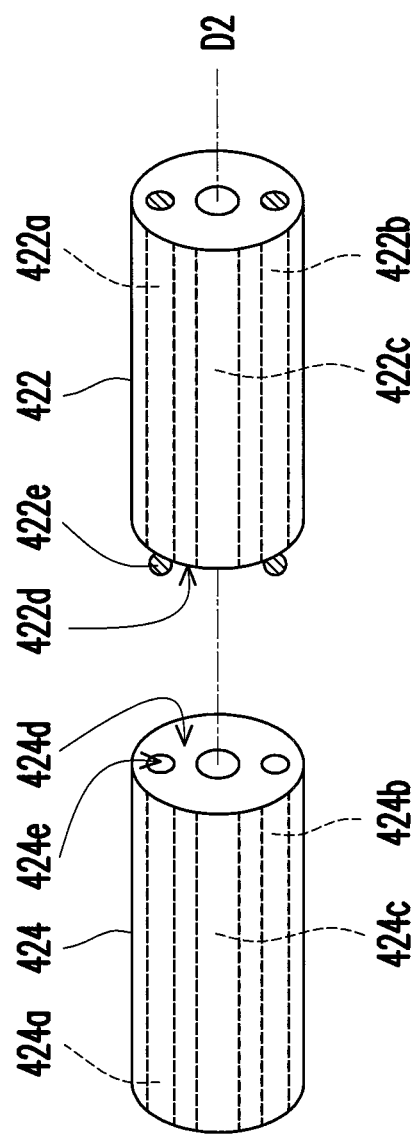
FIG. 5 is an exploded view of a connection part in FIG. 4E.

FIG. 5 is an exploded view of a connection part in FIG. 4E. Please refer to both FIGS. 4E and 5. According to the present embodiment, the connection part 420 includes a first part 422 and a second part 420. The first part 422 is connected to the first photoelectric conversion board 100A, and the second part 424 is connected to the display unit 300. Moreover, a first anode line 422a, a second anode line 422b, and a common cathode line 422c are disposed in the first part 422, wherein the first anode line 422a is electrically connected to the first photoelectric conversion unit 120 (shown in FIGS. 4A to 4D), the second anode line 422b is electrically connected to the second photoelectric conversion unit 130 (shown in FIGS. 4A to 4D), and the common cathode line 422c is electrically connected to the first photoelectric conversion unit 120 and the second photoelectric conversion unit 130. Moreover, the second part 424 includes a first circuit 424a, a second circuit 424b, a third circuit 424c which are individually and electrically connected to the display unit 300, wherein the first circuit 424a and the first anode line 422a are electrically connected, the second circuit 424b and the second anode line 422b are electrically connected, and the third circuit 424c and the common cathode line 422c are electrically connected.

According to the present embodiment, the first part 422 further includes a first rotation disk 422d, and the second part 424 further includes a second rotation disk 424d. Through coupling between the first rotation disk 422d and the second rotation disk 424d, the photoelectric conversion board 100A is able to be rotated along the second direction D2. In addition, the first part 422 and the second part 424 are electrically connected through connection by the first rotation disk 422d and the second rotation disk 424d. It should be noted that a plurality of bearings 422e which are electrically connected to the first anode line 422a or the second anode line 422b are disposed on the first rotation disk 422d, and a plurality of bearing fixation grooves 424e which are electrically connected to the first circuit 424a or the second circuit 424b are disposed on the second rotation disk 424d. When the bearings 422e and the bearing fixation grooves 424e come into contact with each other, the first part 422 and the second part 242 are electrically connected. According to the present embodiment, no matter how the photoelectric conversion board 100A is rotated relative to the display unit 300 to expose the first photoelectric conversion unit 120 or the second photoelectric conversion unit 130 outside the electronic device 10, power generated by the photoelectric conversion board 100A is able to be transmitted to the electronic device 10 through an electric connection between the first part 422 and the second part 424.

According to the present embodiment, an area of the first photoelectric conversion board 100A is less than an area of the back surface A2 of the display unit 300. However, the disclosure is not limited to this configuration. In other words, according to another embodiment, the first photoelectric conversion board 100A may be a foldable photoelectric conversion board whose area is greater than the area of the back surface A2 of the display unit 300. However, after being folded, the photoelectric conversion board is able to be housed on the back surface A2 of the display unit 300.

Figure 6A:
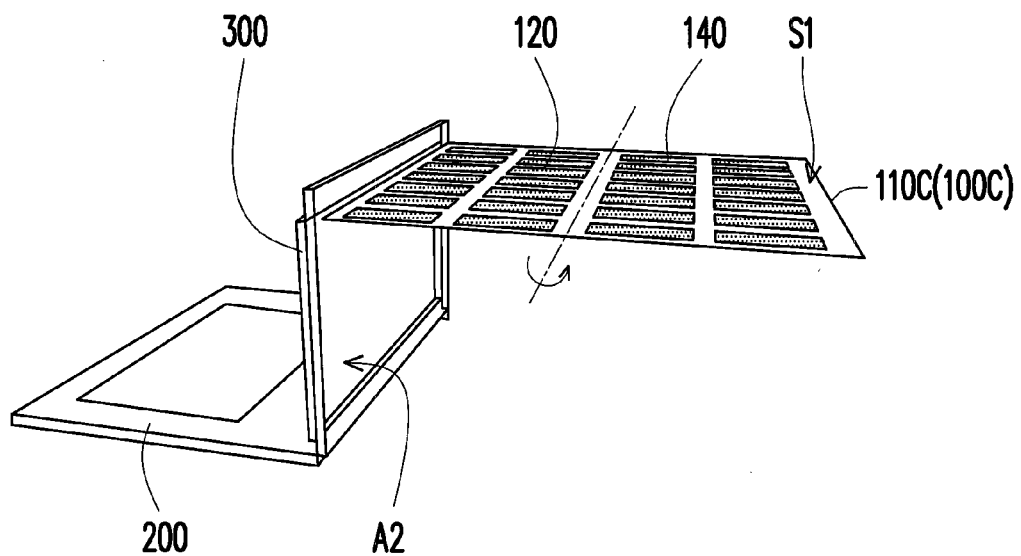
FIGS. 6A and 6B each shows a photoelectric conversion board of an electronic device viewed from a different angle according to another embodiment of the disclosure.
Figure 6B:
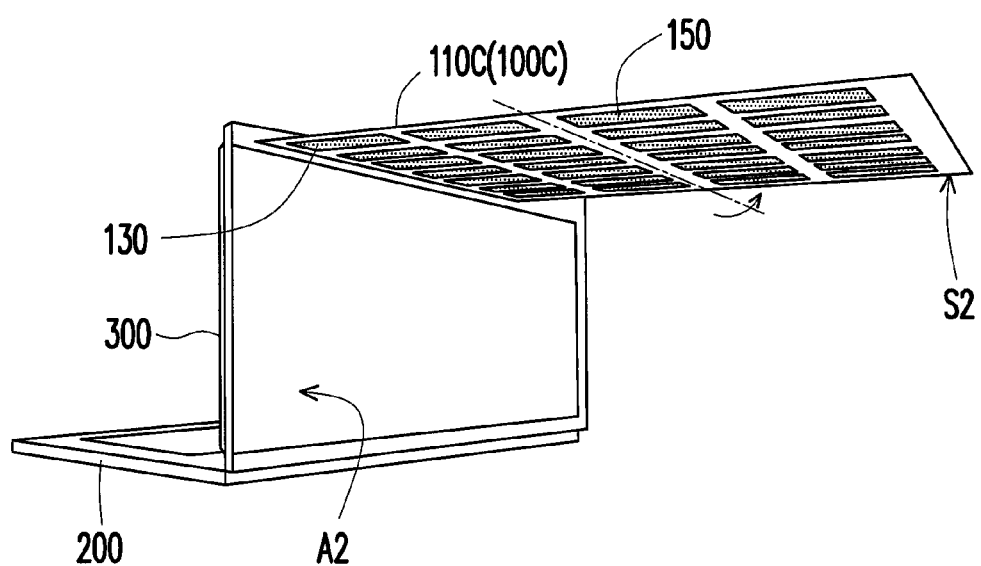

FIGS. 6A and 6B each shows a photoelectric conversion board of an electronic device viewed from a different angle according to another embodiment of the disclosure. Please refer to FIGS. 6A and 6B. According to the present embodiment, a first substrate 110C of a first photoelectric conversion board 100C is, for example, a foldable substrate. After being folded, the first photoelectric conversion board 100C is able to be housed on the back surface A2 of the display unit 300, and after being expanded, an area of the first photoelectric conversion board 100C is greater than the area of the back surface A2 of the display unit 300. According to the present embodiment, after the first photoelectric conversion board 100C is expanded, the first photoelectric conversion unit 120 is disposed on the first surface S1 thereof, and the second photoelectric conversion unit 130 is disposed on the second surface S2 thereof. Furthermore, according to the present embodiment, after the first photoelectric conversion board 100C is expanded, a third photoelectric conversion unit 140 is further disposed on the first surface S1 of the first photoelectric conversion board 100C, and a fourth photoelectric conversion unit 150 is further disposed on the second surface S2 of the first photoelectric conversion board 100C. An absorption band of the third photoelectric conversion unit 140 is, for example, the same as the adsorption band of the first photoelectric conversion unit 120, and an absorption band of the fourth photoelectric conversion unit 150 is, for example, the same as the adsorption band of the second photoelectric conversion unit 130. Hence, a light incident area of the first photoelectric conversion board 100C is greatly increased due to the foldable structure of the first substrate 110C, thereby increasing the power generated by the first photoelectric conversion board 100C to supply to the electronic device.

According to the present embodiment, through the rotation unit 400 described in the previous embodiment, rotation between the first surface S1 and the second surface S2 of the first photoelectric conversion board 100C may be performed (i.e. switching between the first photoelectric conversion unit 120 with the third photoelectric conversion unit 140 and the second photoelectric conversion unit 130 with the fourth photoelectric conversion unit 150). Furthermore, according to an embodiment, the absorption band of the third photoelectric conversion unit 140 may be different from the adsorption band of the first photoelectric conversion unit 120, and the absorption band of the fourth photoelectric conversion unit 150 may also be different from the adsorption band of the second photoelectric conversion unit 130. Hence, no matter how the first photoelectric conversion is rotated relative to the display unit 300, since there are photoelectric conversion units with different absorption bands on the same surface, adaptability of the first photoelectric conversion board 100C is increased.

Figure 6C:
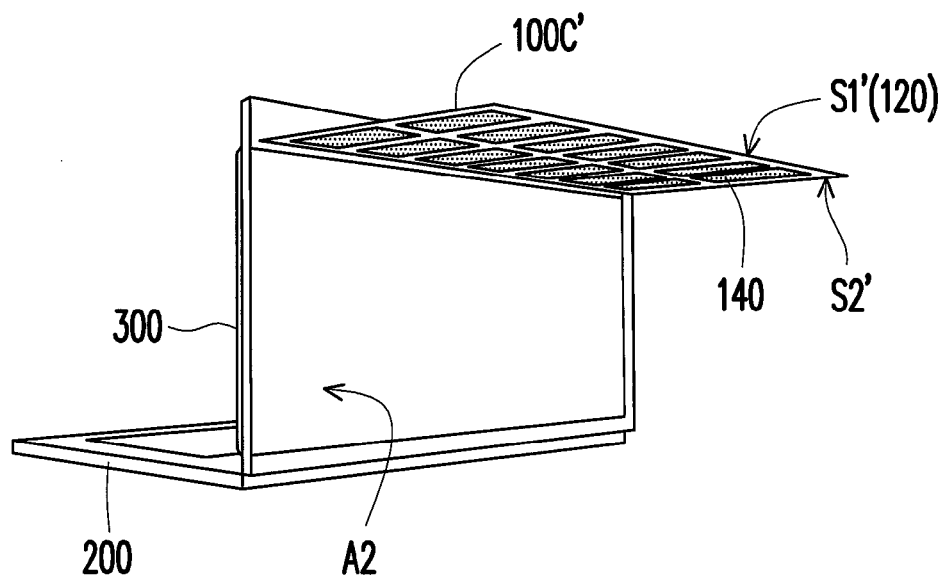
FIGS. 6C and 6D are each a schematic view of the photoelectric conversion board in FIGS. 6A and 6B after being folded.
Figure 6D:
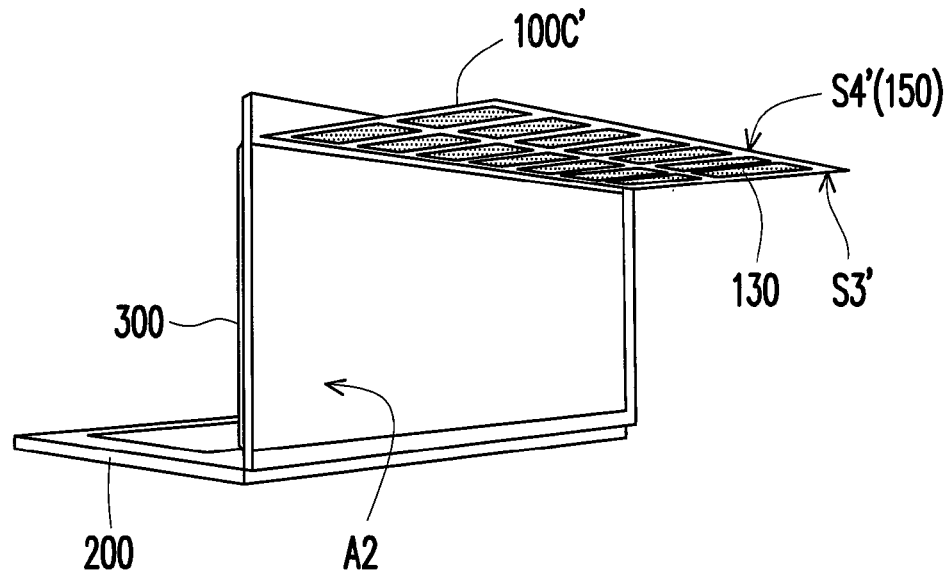
Figure 7A:
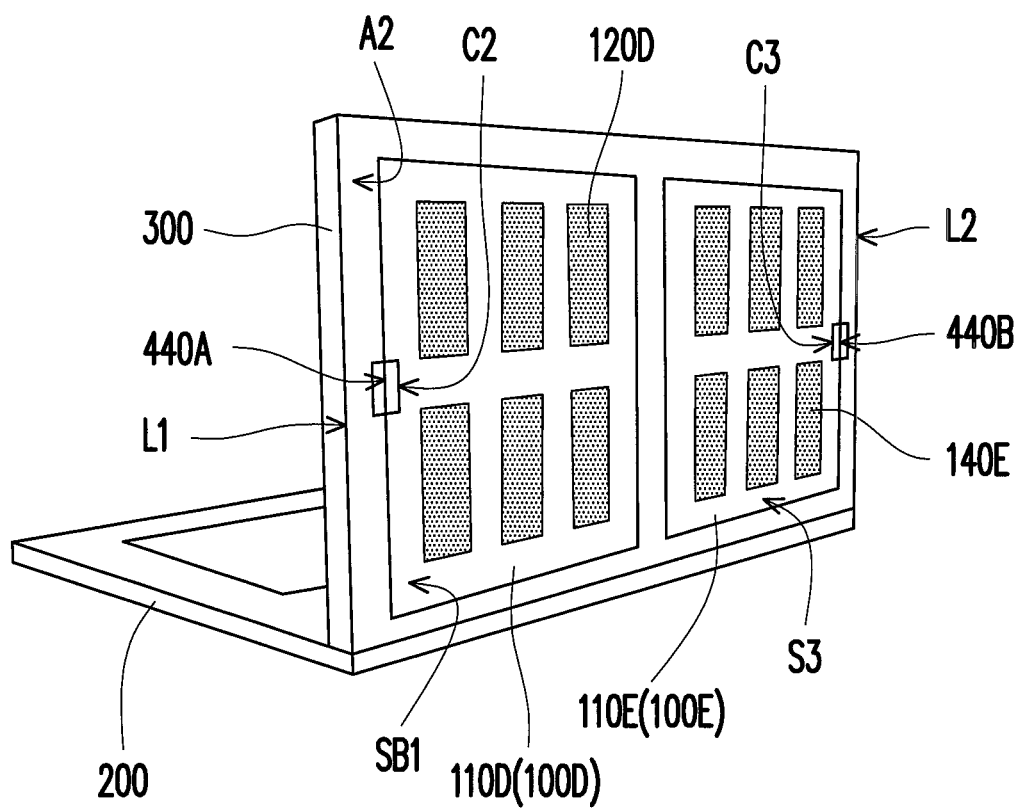
FIGS. 7A to 7D show a switching process of photoelectric conversion boards in an electronic device according to another embodiment of the disclosure.
Figure 7B:
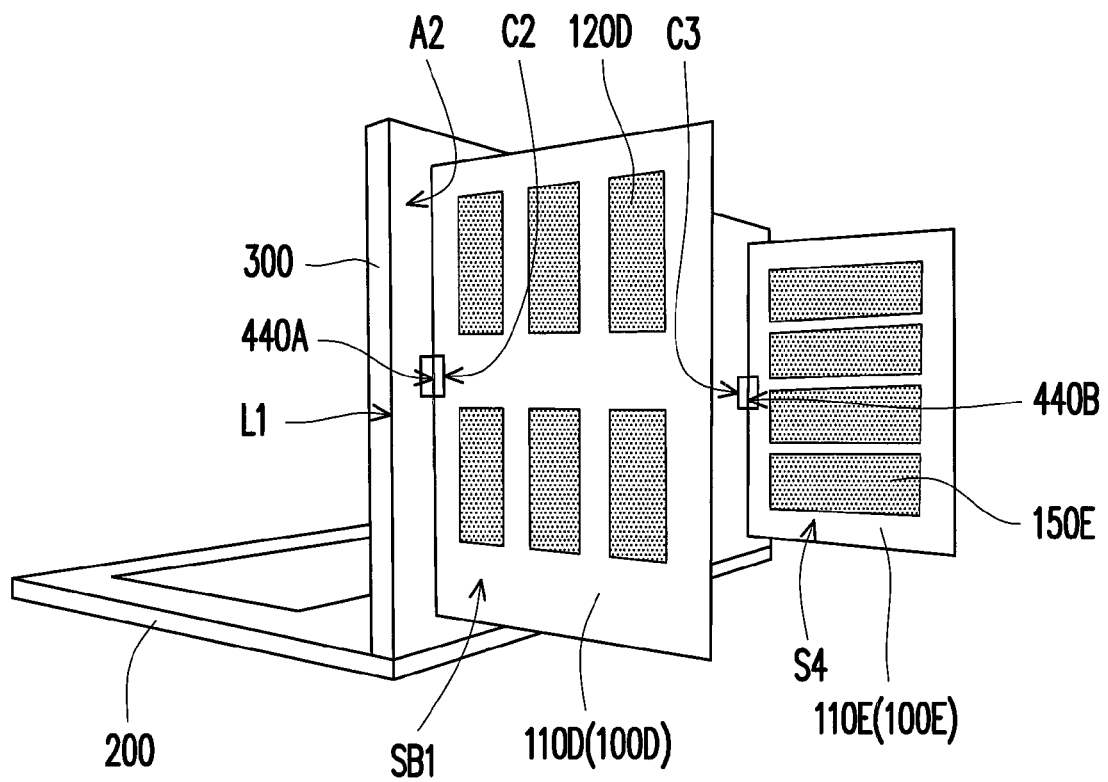
Figure 7C:
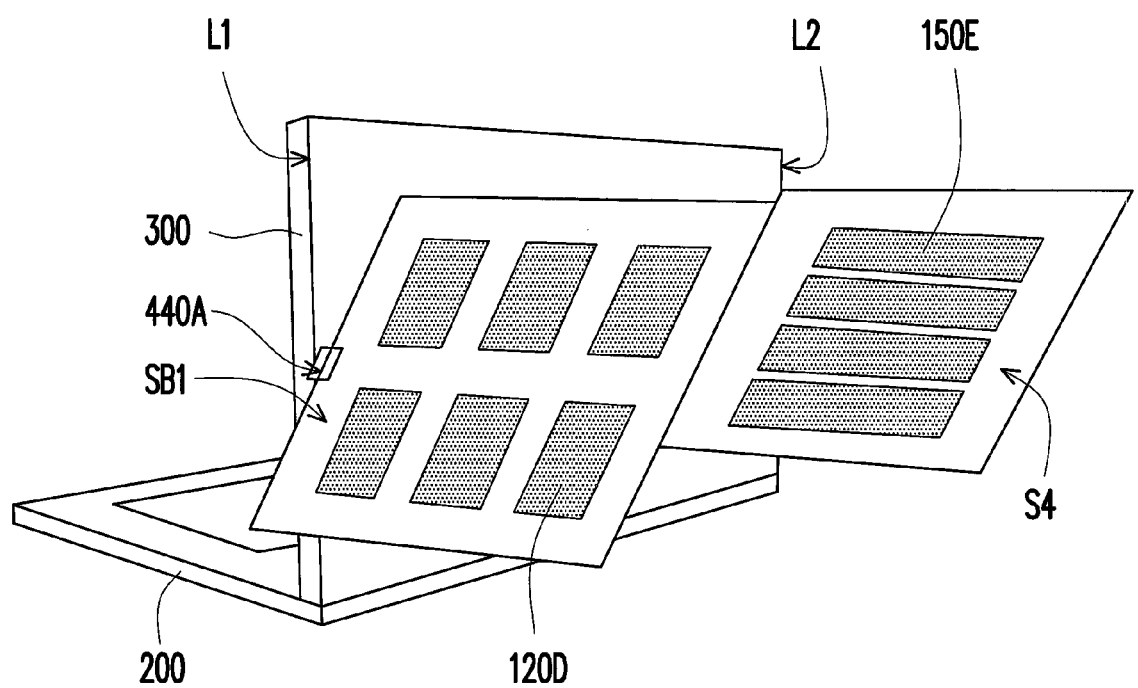
Figure 7D:
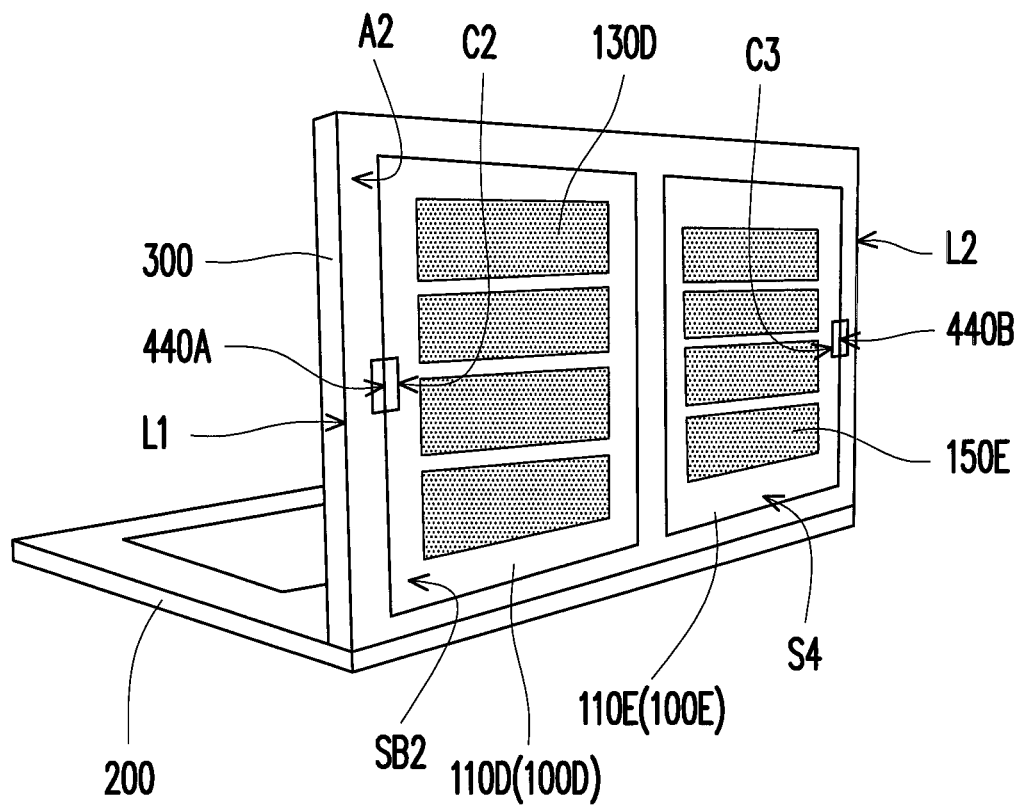

FIGS. 6C and 6D are each a schematic view of the photoelectric conversion board in FIGS. 6A and 6B after being folded. Referring to FIG. 6C and according to the present embodiment, after being folded, a first photoelectric conversion board 100C' includes the first photoelectric conversion unit 120 and the third photoelectric conversion unit 140 respectively disposed on a first surface S1' and a second surface S2'. Referring to FIG. 6D, after being folded, the first photoelectric conversion board 100C' includes the second photoelectric conversion unit 130 and the fourth photoelectric conversion unit 150 respectively disposed on a third surface S3' and a fourth surface S4'. Similarly, for the first photoelectric conversion board 100C' which is folded in a manner shown in FIG. 6C, through the rotation unit 400 described in the previous embodiment, switching between the first photoelectric conversion unit 120 and the third photoelectric conversion unit 140 is able to be performed. For the first photoelectric conversion board 100C' which is folded in a manner shown in FIG. 6D, through the rotation unit 400 described in the previous embodiment, switching between the second photoelectric conversion unit 130 and the fourth photoelectric conversion unit 150 is able to be performed According to the present embodiment, the absorption band of the third photoelectric conversion unit may be designed to be different from the absorption band of the first photoelectric conversion unit, and the absorption band of the fourth photoelectric conversion unit may be designed to be different from the absorption band of the second photoelectric conversion unit. Therefore, after switching, the first photoelectric conversion 100C' which is folded may use different photoelectric conversion units. This effectively increases the types of photoelectric conversion units, thereby increasing the adaptability of the photoelectric conversion board to different wavelength bands in the environment.

FIGS. 7A to 7D show a switching process of photoelectric conversion boards in an electronic device according to another embodiment of the disclosure. According to the present embodiment, in addition to the main host 200 and the display unit 300, an electronic device 20 further includes a first photoelectric conversion board 100D and a second photoelectric conversion board 100E, wherein a first connection point 440A corresponds to a center point C2 of a first edge L1 of the first photoelectric conversion board 100D, and a second connection point 440B corresponds to a center point C3 of a second edge L2 of the second photoelectric conversion board 100E. In other words, the first photoelectric conversion board 100D and the second photoelectric conversion board 100E respectively use their sides and the rotation units 440A and 440B to be rotatably connected to the back surface A2 of the display unit 300.

According to the present embodiment, the first photoelectric conversion board 100D includes a first substrate 110D, a first photoelectric conversion unit 120D, and a second photoelectric conversion unit 130D (not shown in the drawings). The second photoelectric conversion board 100E includes a second substrate 110E, a third photoelectric conversion unit 140E, and a fourth photoelectric conversion unit 150E. The first substrate 110D includes a first surface SB1 and a second surface SB2 (not shown) which are opposite to each other, wherein the first photoelectric conversion unit 120D is disposed on the first surface SB1, the second photoelectric conversion unit 130D is disposed on the second surface SB2, and an absorption band of the first photoelectric conversion unit 120D is different from an absorption band of the second photoelectric conversion unit 130D. On the other hand, the second substrate 110E includes a third surface S3 and a fourth surface S4 which are opposite to each other, wherein the third photoelectric conversion unit 140E is disposed on the third surface S3, the fourth photoelectric conversion unit 150E is disposed on the fourth surface S4, and an absorption band of the third photoelectric conversion unit 140E is different from an absorption band of the fourth photoelectric conversion unit 150E. Therefore, the first photoelectric conversion board 100D and the second photoelectric conversion board 100E which are symmetrical to each other are able to be switched to different photoelectric conversion units.

Moreover, the first photoelectric conversion board 100D is connected to the display unit 300 through the first connection point 440A, and the first connection point 440A is disposed on the back surface A2 and maintains a distance from the first edge L1 of the back surface A2. The second photoelectric conversion board 100E is connected to the display unit 300 through the second connection point 440B, and the second connection point 440B is disposed on the back surface A2 and maintains a distance from the second edge L2 of the back surface A2. The first edge L1 and the second edge L2 are located on opposite sides of the display unit 300. In other words, according to the present embodiment, the first photoelectric conversion board 100D and the second photoelectric conversion board 100E are symmetrical to each other, pivotally disposed on the back surface A2 of the display unit 300, and are rotated relative to the display unit 300 in an manner like opening the window to be switched to different photoelectric conversion units.

Figure 8A:
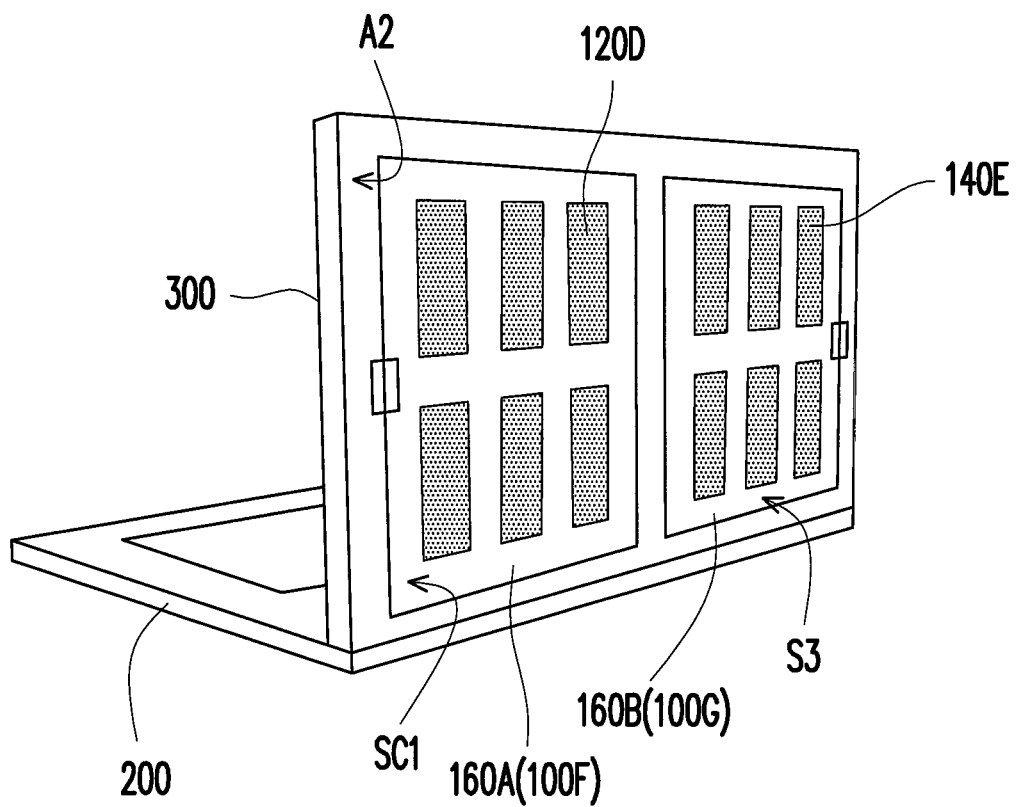
FIGS. 8A to 8C show a switching process of photoelectric conversion boards in an electronic device according to another embodiment of the disclosure.
Figure 8B:
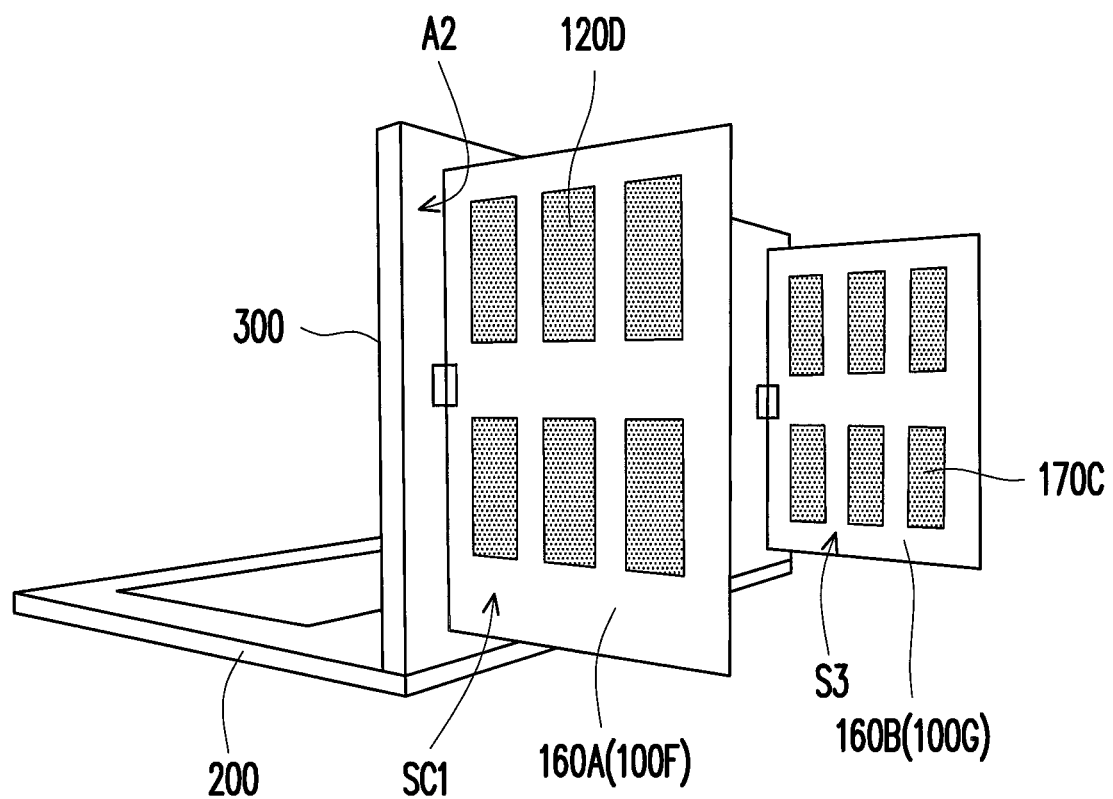
Figure 8C:
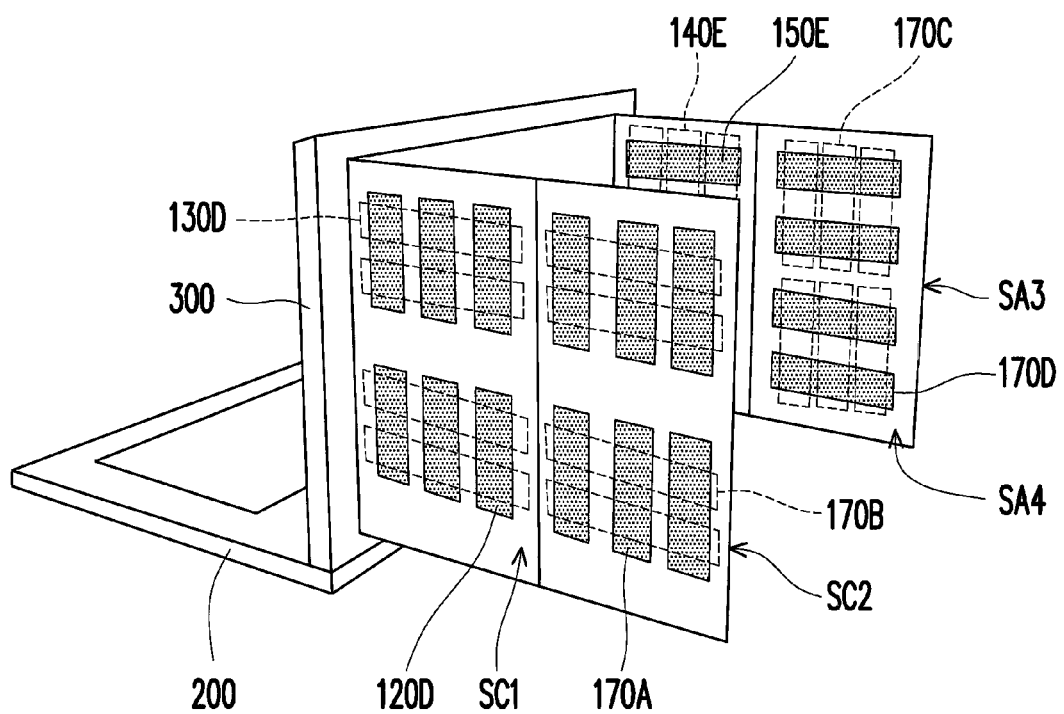

FIGS. 8A to 8C show a switching process of photoelectric conversion boards in an electronic device according to another embodiment of the disclosure. Please refer to FIGS. 8A to 8C. Similar to the embodiment shown in FIGS. 6A to 6D, each of the first substrate 160A and the second substrate 160B according to the present embodiment is a foldable substrate. After being folded, a first photoelectric conversion board 100F is able to be housed on a back surface A2 of the display unit 300, and after being folded, a second photoelectric conversion board 100G is able to be housed on the back surface A2 of the display unit 300. In further detail, after being expanded, the first photoelectric conversion board 100F has a fifth photoelectric conversion unit 170A disposed on a first surface SC1 thereof, and has a sixth photoelectric conversion unit 170B disposed on a second surface SC2 which is opposite to the first surface SC1. Furthermore, after being expanded, the second photoelectric conversion board 100G has a seventh photoelectric conversion unit 170C disposed on a third surface SA3 thereof, and has an eighth photoelectric conversion unit 170D disposed on a fourth surface SA4 which is opposite to the third surface SA3.

According to the present embodiment, an absorption band of the fifth photoelectric conversion unit 170A is the same as the adsorption band of the first photoelectric conversion unit 120D, an absorption band of the sixth photoelectric conversion unit 170B is the same as the adsorption band of the second photoelectric conversion unit 130D, an absorption band of the seventh photoelectric conversion unit 170C is the same as the adsorption band of the third photoelectric conversion unit 140E, and an absorption band of the eighth photoelectric conversion unit 170D is the same as the adsorption band of the fourth photoelectric conversion unit 150E. Hence, each of the photoelectric conversion units has a greater light incident area and enhanced photoelectric conversion efficiency. According to another embodiment not shown in the drawings, the absorption band of the fifth photoelectric conversion unit is different from the adsorption band of the first photoelectric conversion unit, the absorption band of the sixth photoelectric conversion unit is different from the adsorption band of the second photoelectric conversion unit, the absorption band of the seventh photoelectric conversion unit is different from the adsorption band of the third photoelectric conversion unit, and the absorption band of the eighth photoelectric conversion unit is different from the adsorption band of the fourth photoelectric conversion unit. This effectively enlarges the absorption bands of the photoelectric conversion units on the same surface, thereby making the photoelectric conversion boards suitable for different environments.

Therefore, the disclosure does not limit that the photoelectric conversion units on the same surface must be photoelectric conversion units having the same absorption bands. A designer may optimize the configuration according to operation environments.

Figure 9A:
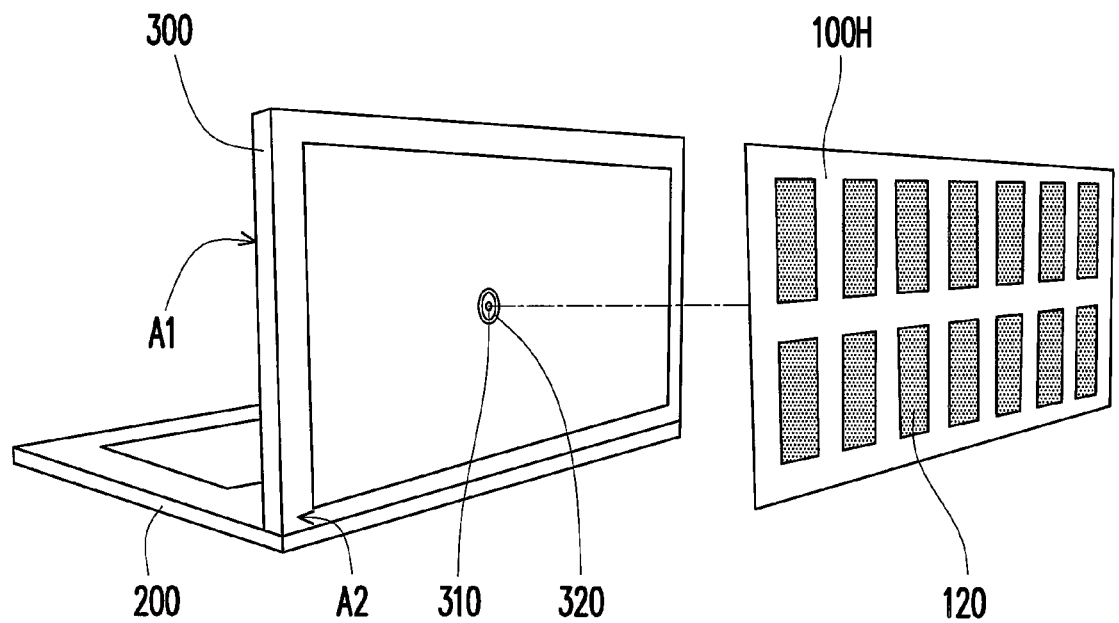
FIG. 9A is a schematic view of an electronic device according to another embodiment of the disclosure.
Figure 9B:
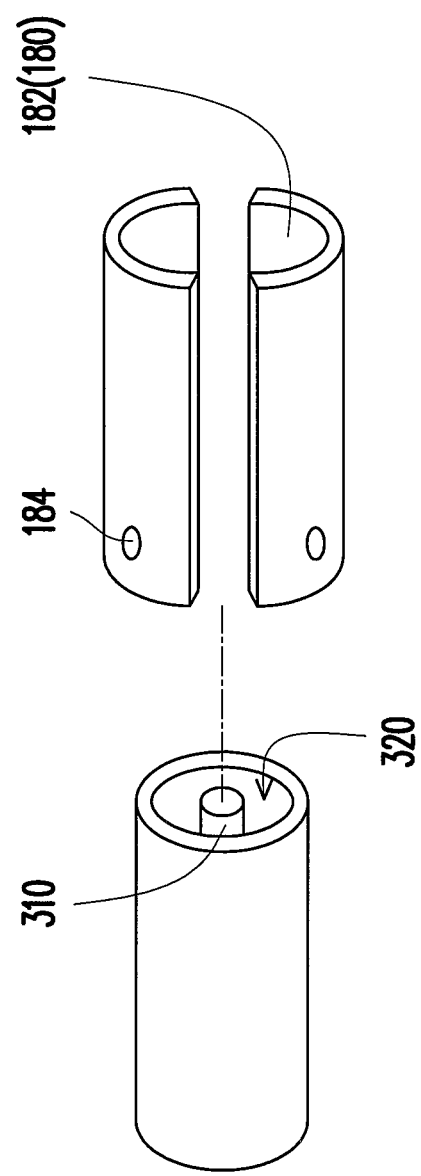
FIG. 9B is a magnified partial view of FIG. 9A.

FIG. 9A is a schematic view of an electronic device according to another embodiment of the disclosure. FIG. 9B is a magnified partial view of FIG. 9A. Please refer to FIGS. 9A and 9B. Elements similar to those in the above embodiment are not repeatedly described. A difference between the present embodiment and the above embodiment is that the display unit 300 further includes a first terminal 310 on the back surface A2, a first substrate 180 further includes a second terminal 182, and the second terminal 182 is connected to the first terminal 310 in a detachable manner, so that when a first photoelectric conversion board 100H is disposed on the back surface A2 of the display unit 300, the first photoelectric conversion board 100H and the display unit 300 are electrically connected.

According to the present embodiment, the first photoelectric conversion board 100H and the back surface A2 of the display unit 300 are combined through a first buckling structure 320 and a second buckling structure 184. The first buckling structure 320 is disposed on the back surface A2 of the display unit 300, and the second buckling structure 184 is disposed on the first photoelectric conversion board 100H. In detail, the first buckling structure 320 is, for example, a buckling hole, and the second buckling structure 184 is, for example, an elastic buckling element 184 which is integrally formed with the second terminal 182, so that the first photoelectric conversion board 100H is able to be assembled on the back surface A2 of the display unit 300. However, the disclosure does not limit the mechanism by which the first photoelectric conversion board 100H is assembled to the display unit 300. According to the present embodiment, the user may disassemble the first photoelectric conversion board 100H from the back surface A2, rotate the first photoelectric conversion board 100H, and reassemble the first photoelectric conversion board 100H with the back surface A2 according to different environments, so that the photoelectric conversion units on the other surface of the board are exposed on the back surface A2 of the display unit 300. Thus, the first photoelectric conversion board 100H according to the present embodiment is able to achieve the same effects as those achieved in the above embodiment.

In summary, according to the above embodiments of the disclosure, the photoelectric conversion units with different absorption bands are disposed on the photoelectric conversion board. Therefore, according to the different environments in which the electronic device is placed, by switching to the photoelectric conversion units that correspond to said environment, the photoelectric conversion board has greater photoelectric conversion efficiency in different environments.

Furthermore, through their edges, the photoelectric conversion boards are rotatably connected to the display unit of the electronic device. Alternatively, the corresponding terminals may be disposed on the photoelectric conversion boards and the display unit, so that the different photoelectric conversion units on the photoelectric conversion board may be switched.

According to the embodiments of the disclosure, the terminals or the photoelectric conversion boards are all disposed on the back surface of the display unit or the electronic device. However, the disclosure is not limited to this configuration. The terminals or the photoelectric conversion boards may be disposed on any surface of the electronic device or the display unit, so that the photoelectric conversion boards are connected to the electronic device or the display unit in a rotatable or detachable manner. Thus, the photoelectric conversion boards have greater adaptability, so as to provide more stable power to the electronic device.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
a display unit, comprising a display surface and a back surface which are opposite to each other;
a first photoelectric conversion board, comprising a first substrate, a first photoelectric conversion unit, and a second photoelectric conversion unit, wherein an edge of the first photoelectric conversion board is rotatably connected to the display unit, the first substrate comprises a first surface and a second surface which are opposite to each other, the first photoelectric conversion unit is disposed on the first surface, the second photoelectric conversion unit is disposed on the second surface, and an absorption band of the first photoelectric conversion unit is different from an absorption band of the second photoelectric conversion unit;
a pivotal axis and a connection part, the pivotal axis being disposed on the back surface of the display unit, and the connection part being connected to the first photoelectric conversion board and being pivotally disposed at the pivotal axis such that the first photoelectric conversion board rotates along a first axial direction and a second axial direction, and the first axial direction is perpendicular to the second axial direction.

2. The electronic device as claimed in claim 1, wherein the edge of the first photoelectric conversion board is rotatably connected to the back surface of the display unit.

3. The electronic device as claimed in claim 2, wherein the first photoelectric conversion board is connected to the display unit through a first connection point, and the first connection point is disposed on the back surface and maintains a distance from an edge of the back surface.

4. The electronic device as claimed in claim 3, wherein the first connection point corresponds to a center point on an edge of the first photoelectric conversion board.

5. The electronic device as claimed in claim 1, wherein the first photoelectric conversion unit and the second photoelectric conversion unit are respectively formed on the first surface and the second surface of the first substrate.

6. The electronic device as claimed in claim 1, wherein a second substrate is further disposed between the first substrate and the second photoelectric conversion unit, and the first photoelectric conversion unit and the second photoelectric conversion unit are respectively formed on the first substrate and the second substrate.

7. The electronic device as claimed in claim 1, wherein the first and second photoelectric conversion unit each comprise at least one solar cell selected from monocrystalline silicon solar cell, polycrystalline silicon solar cell, amorphous silicon solar cell, dye-sensitized solar cell, organic photovoltaic, compound solar cell, and photo-charged materials solar cell.

8. The electronic device as claimed in claim 1, wherein the absorption bands of the first photoelectric conversion unit and the second photoelectric conversion unit are selected from one of visible light, near-infrared, mid-infrared, and far-infrared.

9. The electronic device as claimed in claim 1, wherein the connection part comprises a first part and a second part, the first part is connected to the first photoelectric conversion board, and the second part is connected to the display unit.

10. The electronic device as claimed in claim 9, wherein the first part includes a first anode line, a second anode line, and a common cathode line, the first anode line is electrically connected to the first photoelectric conversion unit, the second anode line is electrically connected to the second photoelectric conversion unit, the common cathode line is electrically connected to the first photoelectric conversion unit and the second photoelectric conversion unit, the second part includes a first circuit, a second circuit, and a third circuit which are each individually connected to the display unit, the first circuit is electrically connected to the first anode line, the second circuit is electrically connected to the second anode line, and the third circuit is electrically connected to the common cathode line.

11. The electronic device as claimed in claim 10, wherein the first part further comprises a first rotation disk, the second part further comprises a second rotation disk, and the first part and the second part are electrically connected to each other through the connection between the first rotation disk and the second rotation disk.

12. The electronic device as claimed in claim 11, wherein a plurality of bearings which are each electrically connected to the first anode line or the second anode line are disposed on the first rotation disk, a plurality of bearing fixation grooves which are each electrically connected to the first circuit or the second circuit are disposed on the second rotation disk, and when the bearings and the bearing fixation grooves come into contact and correspond to each other, the first part and the second part are electrically connected.

13. The electronic device as claimed in claim 1, wherein the first substrate is a foldable substrate, and after being folded, the first photoelectric conversion board is able to be housed on the back surface of the display unit.

14. The electronic device as claimed in claim 13, wherein a third photoelectric conversion unit is further disposed on the first surface of the first photoelectric conversion board, and a fourth photoelectric conversion unit is further disposed on the second surface of the second photoelectric conversion board.

15. The electronic device as claimed in claim 14, wherein an absorption band of the third photoelectric conversion unit is different from the absorption band of the first photoelectric conversion unit.

16. The electronic device as claimed in claim 15, wherein an absorption band of the fourth photoelectric conversion unit is different from the absorption band of the second photoelectric conversion unit.

17. The electronic device as claimed in claim 1, further comprising a second photoelectric conversion board, which comprises a second substrate, a, third photoelectric conversion unit, and a fourth photoelectric conversion unit, wherein an edge of the second photoelectric conversion board is rotatably connected to the back surface of the display unit, the second substrate comprises a third surface and a fourth surface which are opposite to each other, the third photoelectric conversion unit is disposed on the third surface, the fourth photoelectric conversion unit is disposed on the fourth surface, and an absorption band of the third photoelectric conversion unit is different from an absorption band of the fourth photoelectric conversion unit.

18. The electronic device as claimed in claim 17, wherein the first photoelectric conversion board is connected to the display unit through a first connection point, the first connection point is disposed on the back surface and maintains a distance from a first edge of the back surface, the second photoelectric conversion board is connected to the display unit through a second connection point, the second connection point is disposed on the back surface and maintains a distance from a second edge of the back surface, and the first edge and the second edge are located on opposite sides of the display unit.

19. The electronic device as claimed in claim 18, wherein the first connection point corresponds to a center point on a first edge of the first photoelectric conversion board, and the second connection point corresponds to a center point on a second edge of the second photoelectric conversion board.

20. The electronic device as claimed in claim 17, wherein each of the first substrate and the second substrate is a foldable substrate, the first photoelectric conversion board after being folded is able to be housed on the back surface of the display unit, and the second photoelectric conversion board after being folded is able to be housed on the back surface of the display unit.

21. The electronic device as claimed in claim 20, wherein a fifth photoelectric conversion unit is further disposed on the first surface of the first photoelectric conversion board, a sixth photoelectric conversion unit is further disposed on the second surface of the first photoelectric conversion board, a seventh photoelectric conversion unit is further disposed on the third surface of the second photoelectric conversion board, and an eighth photoelectric conversion unit is further disposed on the fourth surface of the second photoelectric conversion board.

22. The electronic device as claimed in claim 21, wherein an absorption band of the fifth photoelectric conversion unit is different from the absorption band of the first photoelectric conversion unit.

23. The electronic device as claimed in claim 21, wherein an absorption band of the sixth photoelectric conversion unit is different from the absorption band of the second photoelectric conversion unit.

24. The electronic device as claimed in claim 21, wherein an absorption band of the seventh photoelectric conversion unit is different from the absorption band of the third photoelectric conversion unit.

25. The electronic device as claimed in claim 21, wherein an absorption band of the eighth photoelectric conversion unit is different from the absorption band of the fourth photoelectric conversion unit.

26. An electronic device, comprising:
a display unit, comprising a first terminal, a display surface and a back surface which are opposite to each other; and
a photoelectric conversion board, comprising a first substrate, a first photoelectric conversion unit, and a second photoelectric conversion unit, wherein the first substrate comprises a second terminal which is connected to the first terminal of the display unit in a detachable manner, the first substrate comprises a first surface and a second surface which are opposite to each other, the first photoelectric conversion unit is disposed on the first surface, the second photoelectric conversion unit is disposed on the second surface, and an absorption band of the first photoelectric conversion unit is different from an absorption band of the second photoelectric conversion unit.

27. The electronic device as claimed in claim 26, wherein the first terminal is disposed on the back surface of the display unit.

28. The electronic device as claimed in claim 26, wherein the first photoelectric conversion board and the back surface of the display unit are combined through a first buckling structure and a second buckling structure, the first buckling structure is disposed on the back surface of the display unit, and the second buckling structure is disposed on the first photoelectric conversion board.

29. The electronic device as claimed in claim 28, wherein the first buckling structure comprises a buckling hole, and the second buckling structure comprises an elastic buckling element.

30. The electronic device as claimed in claim 26, wherein the first photoelectric conversion unit and the second photoelectric conversion unit are respectively formed on the first surface and the second surface of the first substrate.

31. The electronic device as claimed in claim 26, wherein a second substrate is further disposed between the first substrate and the second photoelectric conversion unit, and the first photoelectric conversion unit and the second photoelectric conversion unit are respectively formed on the first substrate and the second substrate.

32. The electronic device as claimed in claim 26, wherein the first photoelectric conversion unit and the second photoelectric conversion unit each comprise at least one solar cell selected from monocrystalline silicon solar cell, polycrystalline silicon solar cell, amorphous silicon solar cell, dye-sensitized solar cell, organic photovoltaic, compound solar cell, and photo-charged materials solar cell.

33. The electronic device as claimed in claim 26, wherein the absorption bands of the first photoelectric conversion unit and the second photoelectric conversion unit are selected from one of visible light, near-infrared, mid-infrared, and far-infrared.

* * * * *